(12) United States Patent
Merl (10) Patent No.: US 9,591,949 B2
(45) Date of Patent: Mar. 14, 2017

(54) LID FOR A FOOD PROCESSOR

(75) Inventor: Martin Ewald Merl, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 362 days.

(21) Appl. No.: 14/239,402

(22) PCT Filed: Aug. 17, 2012

(86) PCT No.: PCT/IB2012/054186
§ 371 (c)(1),
(2), (4) Date: Feb. 18, 2014

(87) PCT Pub. No.: WO2013/030710
PCT Pub. Date: Mar. 7, 2013

(65) Prior Publication Data
US 2014/0203127 A1    Jul. 24, 2014

Related U.S. Application Data (60) Provisional application No. 61/529,946, filed on Sep. 1, 2011.

(30) Foreign Application Priority Data

Sep. 1, 2011   (EP) .................................... 11179691

(51) Int. Cl.
*A47J 43/00*    (2006.01)
*A47J 43/07*    (2006.01)
*A47J 43/044*   (2006.01)

(52) U.S. Cl.
CPC ......... *A47J 43/0711* (2013.01); *A47J 43/044* (2013.01); *A47J 43/0705* (2013.01); *A47J 43/0755* (2013.01); *A47J 2043/04427* (2013.01)

(58) Field of Classification Search
CPC .. A47J 43/0755; A47J 43/044; A47J 43/0711; A47J 43/0705; A47J 2043/04427
(Continued)

(56) References Cited

U.S. PATENT DOCUMENTS 3,302,894 A * 2/1967 Brezosky .............. E03C 1/2665
241/258
5,129,589 A * 7/1992 Papaleo ................ A47J 43/046
241/101.1
(Continued)

FOREIGN PATENT DOCUMENTS

CN   201384419 U   1/2010
DE     9112234 U1  12/1991
(Continued)

*Primary Examiner* — Faye Francis (57) ABSTRACT

The present application relates to a lid (3) for a food processor (1). The lid is releasably attachable to a container (3) to enclose a food processing tool unit (4) which is operated by a drive unit (5). The lid (3) has a drive unit mount (28) to releasably mount a drive unit (5) to the lid (3), an attachment element to releasably attach the lid (3) to a container (2), and a locking element operable to engage a container (2) attached to the lid (3) when a drive unit (5) is mounted to the lid (3). Therefore, detachment of the lid (3) from a container (2) is prevented by the locking element when a drive unit (5) is mounted to the lid (3). The present application also relates to a food processor (1).

20 Claims, 6 Drawing Sheets

(58) Field of Classification Search
USPC ........ 241/92, 278.1, 285.1, 285.2, 37.5, 258
See application file for complete search history.

(56) References Cited

U.S. PATENT DOCUMENTS

| | | | | |
|---|---|---|---|---|
| 5,735,193 | A * | 4/1998 | Chang | A47J 43/06 |
| | | | | 241/282.1 |
| 5,819,641 | A * | 10/1998 | Hsu | A47J 19/027 |
| | | | | 241/282.1 |
| 6,776,086 | B1 * | 8/2004 | Chang Chien | A47J 43/0766 |
| | | | | 241/37.5 |
| 6,845,932 | B2 * | 1/2005 | Ruttimann | B26D 1/29 |
| | | | | 241/296 |
| 7,028,930 | B2 * | 4/2006 | Carnevale | F16P 3/08 |
| | | | | 241/278.1 |
| 7,069,839 | B2 * | 7/2006 | Kernan | A47J 43/0777 |
| | | | | 241/37.5 |
| 7,229,036 | B2 * | 6/2007 | Carnevale | A47J 43/0772 |
| | | | | 241/101.3 |
| 7,270,286 | B2 * | 9/2007 | Obersteiner | A47J 43/0777 |
| | | | | 241/278.1 |
| 7,530,510 | B2 * | 5/2009 | Newman | A47J 43/044 |
| | | | | 241/37.5 |
| 8,814,072 | B2 * | 8/2014 | Gushwa | A47J 43/0716 |
| | | | | 241/36 |
| 2010/0154658 | A1 | 6/2010 | Conti et al. | |
| 2014/0203127 | A1 | 7/2014 | Merl | |

FOREIGN PATENT DOCUMENTS

| | | |
|---|---|---|
| FR | 2756477 A1 | 6/1998 |
| WO | 2008087644 A2 | 7/2008 |
| WO | 2011001312 A1 | 1/2011 |

* cited by examiner

LID FOR A FOOD PROCESSOR

CROSS-REFERENCE TO PRIOR APPLICATIONS

This application is the U.S. National Phase application under 35 U.S.C. §371 of International Application No. PCT/IB2012/054186, filed on Aug. 17, 2012, which claims the benefit of U.S. Provisional Patent Application No. 61/529,946, filed Sep. 1, 2011 and European Patent Application No. 11179691.8, filed on Sep. 1, 2011. These applications are hereby incorporated by reference herein.

FIELD OF THE INVENTION

The present invention relates to a lid for a food processor. The present invention also relates to a food processor comprising a lid and a container for receiving food stuffs which is releasably attachable to the lid.

BACKGROUND OF THE INVENTION

Food processors are known for mechanically processing food stuffs. The mechanical processing of a food stuff includes the operation of slicing, chopping, cutting, dicing, crushing or grating. A food processor is disclosed in United States patent application no. US20100154658A. Such a food processor has a base unit in which a drive unit is disposed, a container for receiving a mechanically processed food stuff, a food processing tool unit for mechanically processing a food stuff and a lid. An inlet aperture is formed in the lid to allow a food stuff to be fed to the food processing tool unit.

In use, the container is disposed on the base unit and the tool unit is disposed in the upper end of the container. A drive shaft is engaged with the drive unit and upstands in the container to connect the drive unit to the food processing tool unit. The lid is placed over the container to enclose the container and the food processing tool unit. The drive unit is operated at a low speed and with a high torque to allow effective mechanical processing of a food stuff, which is fed towards the food processing tool unit through the inlet aperture in the lid to the food processing tool unit. The food stuff is then mechanically processed by the food processing tool unit before falling into the lower part of the container. For example, if a dicing tool is used as the food processing tool unit, then a food stuff fed to the dicing unit is sliced into cubes.

Another food processor arrangement uses a hand blender as the drive unit. With such a food processor, the hand blender is mounted to the base unit and a gear mechanism is disposed in the base unit which connects the hand blender to the drive shaft. Therefore, the food processing tool unit is driven when the hand blender is operated. The hand blender operates at a high speed and low torque, and so the gear mechanism acts to transmit the rotational motion of the hand blender, whilst reducing the transmitted speed and increasing the torque.

However, one problem with the above food processors is that the lid is easily removed from the container, and/or it is possible to operate the food processor without the lid in place. Therefore, it is possible for a user to easily insert a body part, or another instrument, into the food processing tool unit during use, which may cause injury to the user, or damage to the food processor. Furthermore, the above-described food processors are bulky and space-consuming.

SUMMARY OF THE INVENTION

Therefore, it is an object of the invention to provide a lid for a food processor and/or a food processor which substantially alleviates or overcomes the problems mentioned above.

According to the present invention, there is provided a lid for a food processor which is releasably attachable to a container to enclose a food processing tool unit which is operated by a drive unit, the lid comprising a drive unit mount to releasably mount a drive unit to the lid, an attachment element to releasably attach the lid to a container, and a locking element operable to engage a container attached to the lid when a drive unit is mounted to the lid so that detachment of the lid from a container is prevented by the locking element when a drive unit is mounted to the lid.

This arrangement prevents a user from accessing the food processing tool unit by detaching the lid from a container during operation of the food processor by preventing removal of the lid from a container.

Advantageously, the locking element is a rod which is slidable from a disengaged position to an engaged position to engage with a container attached to the lid when a drive unit is mounted to the lid.

This arrangement provides a simple locking mechanism to prevent a user from removing the lid from a container when a drive unit is mounted to the lid.

Conveniently, one end of the rod extends into the drive unit mount when the rod is in its disengaged position so that a drive unit abuts said one end and urges the rod to slide from its disengaged position to its engaged position when a drive unit is mounted to the lid.

The lid may further comprise a resilient member which acts on the locking element to bias the locking element towards its disengaged position.

Therefore, the locking element is urged to slide out of its engaged position when a drive unit is removed from the lid, and ensures that the lid is detachable from a container when the drive unit is removed.

According to another aspect of the invention, there is provided a food processor comprising a lid, a food processing tool unit, and a container which is releasably attachable to the lid.

Advantageously, the container comprises an attachment member to which the attachment element of the lid is releasably attachable to attach the container to the lid.

Conveniently, one of the attachment element or attachment member is a tab and the corresponding attachment element or attachment member is a slot for receiving the tab so that, when the lid and container are slid relative to each other the tab locates in the slot to attach the lid to the container.

In one embodiment, the lid further comprises a cylindrical collar which overlaps a circumferentially extending wall of the container when the lid and container are brought together, the attachment element being formed on the collar and the attachment member being formed on the wall, and the collar being rotatable relative to the wall to connect the attachment element with the attachment member.

An advantage of the above arrangement is that a simple means of attaching the lid and container to each other is provided by sliding the lid and container relative to each other.

The locking element may be configured to engage with the circumferentially extending wall of the container when the locking element is in its engaging position to prevent the collar from rotating relative to the wall.

Conveniently, the wall further comprises a locking rib protruding therefrom, and the locking element is configured to lie in the path of the locking rib when the locking element is in its engaged position to prevent rotation of the lid relative to the container by the locking element abutting against the locking rib.

An advantage of this arrangement is that the locking rib is easily formed with the container, and so the manufacturing process is simplified.

Advantageously, the lid is releasably connectable to the food processing tool unit and the food processing tool unit is releasably connectable to the container so that the lid is releasably attached to the container when the lid is releasably connected to the food processing tool unit and the food processing tool unit is releasably connected to the container.

An advantage of this arrangement is that the lid is easily attached to the container, and the food processing tool unit is enclosed by the lid and container and fixedly mounted in the space defined by the lid and container.

In one embodiment, the attachment element is a first attachment element and the attachment member is a first attachment member, the food processing tool unit having a second attachment member which is connectable to the first attachment element on the lid and a second attachment element which is connectable to the first attachment member on the container so that the lid is removably attachable to the container.

Therefore, a simple means of connecting the lid, container and tool unit to attach the lid to the container is provided.

Conveniently, the locking element is configured to engage the food processing tool unit and the container so that the food processing tool unit cannot disconnect from the lid and the container cannot disconnect from the food processing tool unit when the locking element is in its engaged position, and so detachment of the lid from the container is prevented.

An advantage of the above arrangement is that both the lid is prevented from being disconnected from the food processing tool unit and the food processing tool unit is prevented from being disconnected from the container by a single locking element.

The locking element may be configured to extend through the food processing tool unit to engage the container when the locking element is in its engaged position.

The food processor may further comprise a drive unit, wherein the drive unit is a hand-blender.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
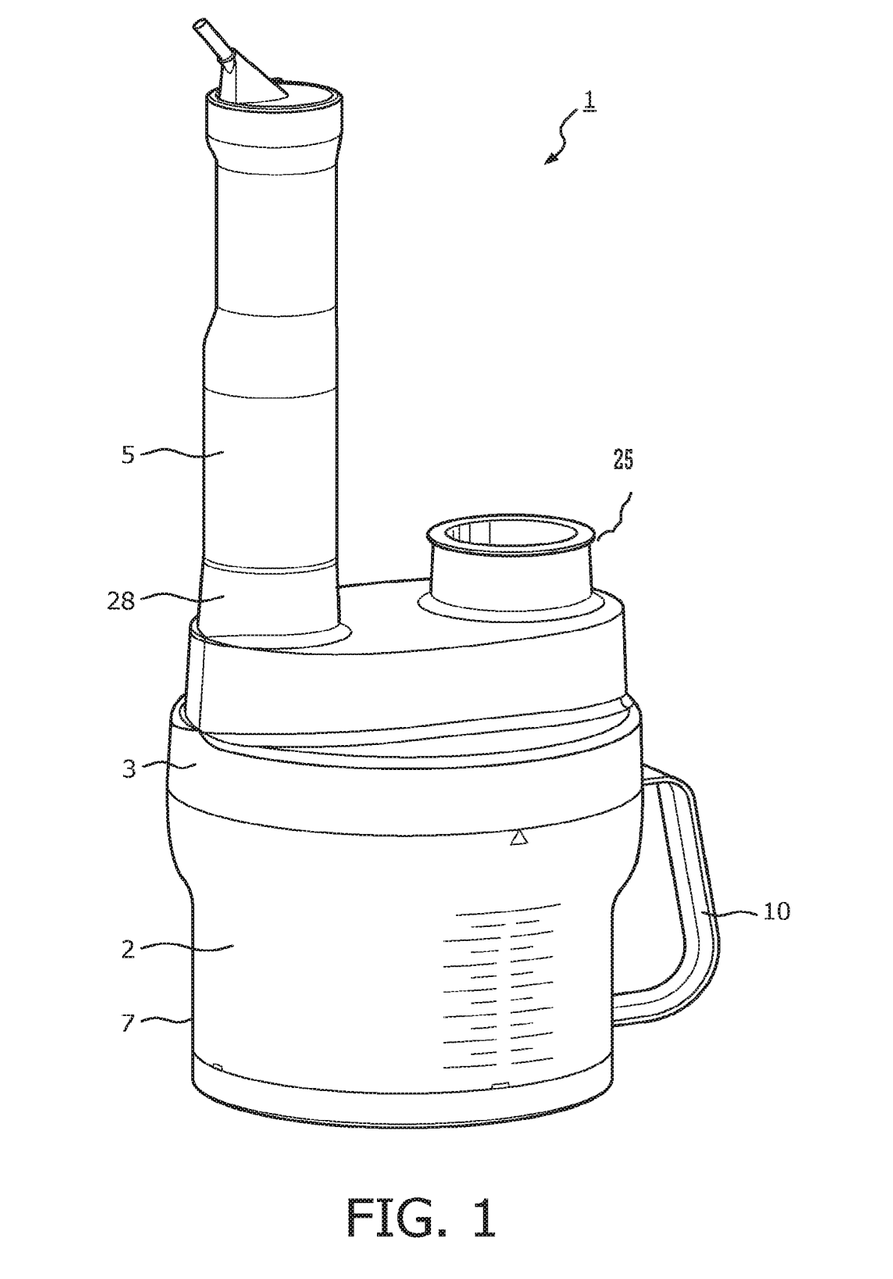
FIG. 1 shows a perspective view of a food processor for mechanically processing food configured with a slicing unit.
Figure 2:
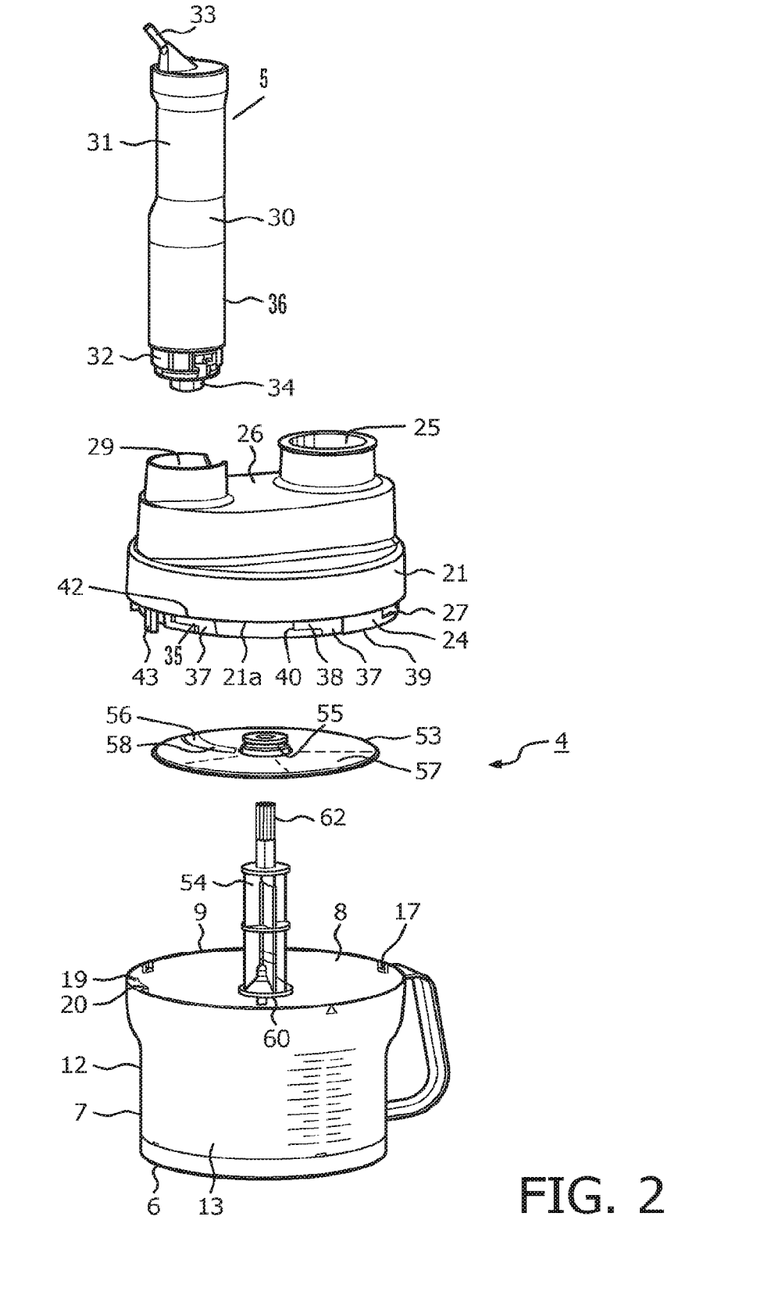
FIG. 2 shows an exploded perspective view of the food processor shown in FIG. 1.

Referring to FIGS. 1 and 2, a food processor 1 is shown which is arranged to mechanically process a food stuff, for example by an operation of slicing, chopping, cutting, dicing, crushing or grating. The food processor 1 comprises a container 2 for storing a food stuff (not shown) that has been mechanically processed, a lid 3, and a food processing tool unit 4 for applying a mechanical process to a food stuff. A hand-held blender 5, acting as a drive unit, is releasably mounted to the lid 3 to drive the food processing tool unit 4, as will become apparent hereinafter.

The container 2 comprises a container base 6, an circumferentially-extending container wall 7 which upstands from the base 6 and an upper opening 8 defined by an upper rim 9 of the container wall 7. The container wall 7 has an inner surface 11 and an outer surface 12. A handle 10 extends from the outer surface 12 of the container wall 7 so that a user is able to hold and manoeuvre the container 2 and therefore the food processor 1. A processed food receiving space 13 is defined in the container 2 to receive a processed food stuff.

In the present embodiment the container 2 is formed from a molded plastic, however it will be appreciated that the container may be formed from any suitable material.

Tabs 17 protrude from the inner surface 11 of the container wall 7 and are equidistantly spaced around the rim 9. Each tab 17 extends from the rim 9. The tabs 17 act as attachment members to attach the container 2 to the lid 3, as will become apparent hereinafter. A locking rib 19 also protrudes from the inner surface 11 and extends from the rim 9. The locking rib 19 is spaced from the attachment tabs 17 and has a side face 20 that extends parallel to the longitudinal axis of the container 2.

A rod-receiving recess (not shown) is formed in the centre of the container base 6 and is arranged to receive a part of the food processing tool unit 4, when necessary, as will become apparent hereinafter.

The lid 3 comprises a main body 23 and a lower circumferentially extending collar 24. The collar 24 extends from a lower end 21 of the main body 23 and the collar's circumferentially extending peripheral surface 27 is inset from the main body 23 to form a circumferentially extending ridge 21a. The main body 23 houses a gear mechanism (not shown). An inlet aperture 25 is formed through the lid 3 and extends from a mouth formed by an upper cylindrical part 26. Therefore, a food stuff is able to be fed through the inlet 25 formed in the lid 3 to the food processing tool unit 4 disposed below the lid 3 when the food processor 1 is assembled, as will become apparent hereinafter. A drive unit mount 28 is formed in the main body 23 of the lid 3 and comprises a cavity 29 in which an end of the drive unit 5 is received.

The hand-held blender 5, acting as a drive unit, comprises a housing 30 with a handle section 31 and a lower end 32. A motor (not shown) is disposed in the handle section 30 and a power cord 33 extends from an upper end of the housing to electrically communicate with a power supply unit (not shown) to supply power to the motor. The motor rotatably drives a drive member 34 disposed at the lower end 32 of the housing. An operating button 36 is located on the housing to operate the motor and urges the drive member 34 to rotate.

The drive unit mount 28 on the lid 3 is configured to receivably mount the lower end 32 of the drive unit housing so that the drive element 34 is disposed in the drive unit mount 28. The gear mechanism (not shown) housed in the lid main body 23 has a drive member engaging element (not shown) in the drive unit mount 28 to mechanically engage with the drive member 34 of the drive unit 5. The gear mechanism also has a food processing tool unit engaging element (not shown) to mechanically engage the food processing tool unit 4 when the food processor 1 is assembled. The gear mechanism is configured to transmit the rotational force of the drive member 34, acting at a high rotational speed and a low torque, to the tool unit 4 to drive the tool unit engaging element at a low speed and high torque.

Slots 35 are formed in the circumferentially extending peripheral surface 27 of the lid collar 24. Each slot 35, acting as an attachment element, comprises an inlet section 37 which extends parallel to the central axis of the lid 3, and an attachment section 38 which extends arcuately around the peripheral surface 27 of the collar 24. The inlet section 37 is open at a lower edge 39 of the collar 24, and the attachment section 38 has an end wall forming an end stop 40. The slots 35, acting as attachment elements, are equidistantly spaced around the collar 24, and the location of each attachment element 35 corresponds to the location of each of the tabs 17 on the container rim 9 so that the slots and tabs align with each other when the container 2 and lid 3 are drawn together. An upper edge 42 of each slot 35 lies along a lower edge of the lid main body 23 from which the collar 24 extends.

Figure 3:
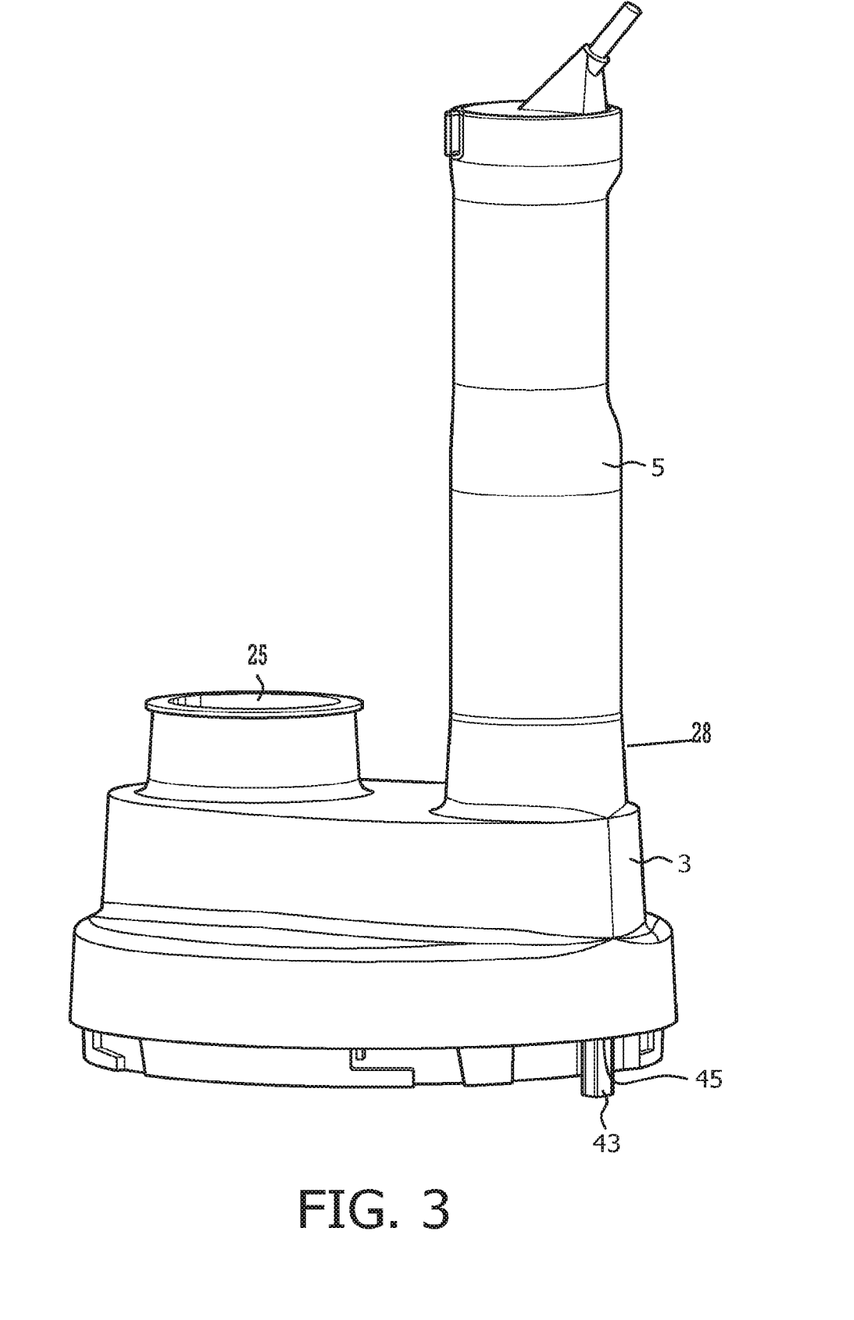
FIG. 3 shows a perspective view of a lid with a drive unit of the food processor shown in FIG. 1 mounted thereto.
Figure 4:
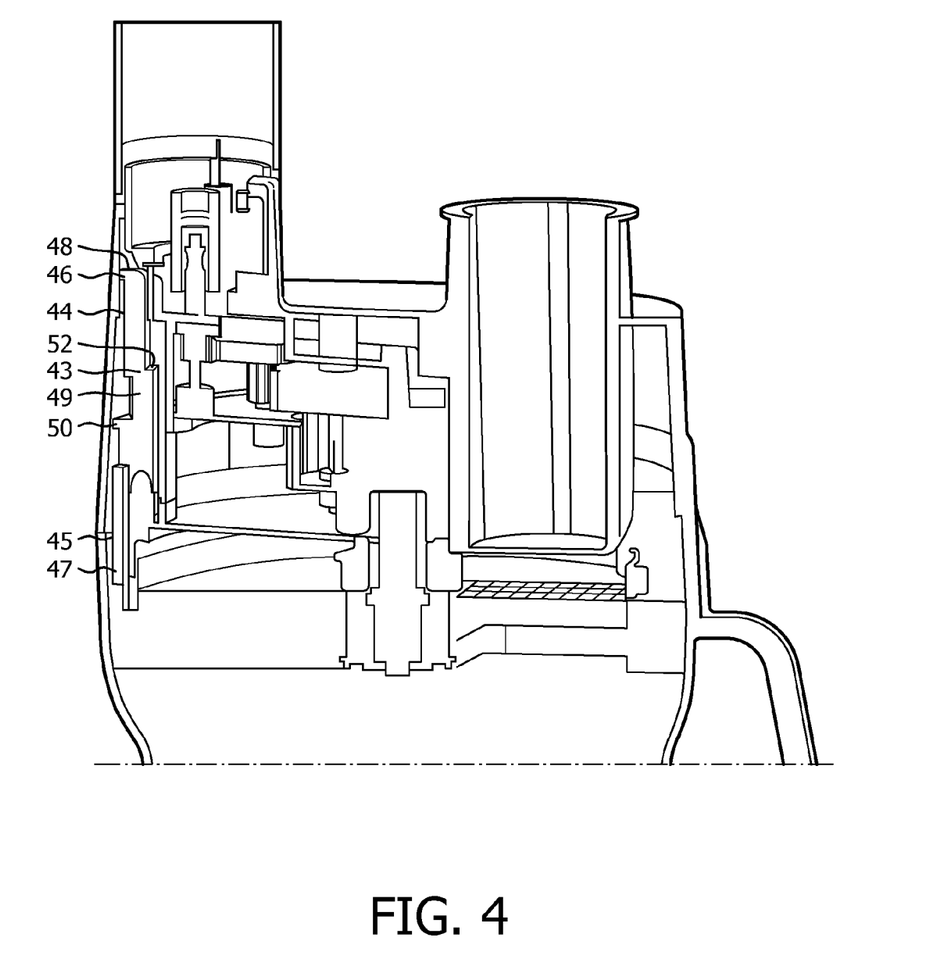
FIG. 4 shows a cross-sectional view of the food processor shown in FIG. 1.

Referring to FIGS. 3 and 4, a locking mechanism is formed in the lid 3. The locking mechanism comprises an elongate locking rod 43 which is slidably mounted in a guide 44 formed in the lid 3. The guide 44 extends from the lower end 21 of the main body 23, and forms a lower opening 45 in the ridge 21a, to the drive unit mount 28, and forms an upper opening 46 in the bottom of the drive unit mount 28.

The locking rod 43, which acts as a locking element, is greater in length than the length of the guide 44, so that a bottom end 47 of the locking rod 43 extends from the lower opening 45 in the ridge 21a or a top end 48 of the locking rod 43 extends from the upper opening 46 in the bottom of the drive unit mount 28 irrespective of the position of the locking rod in the guide 44.

A helical spring 49, acting as a resilient member, is disposed in the guide 44 and locates against the locking rod 43 to urge the top end 48 of the locking rod 43 to extend from upper opening 46 in the bottom of the drive unit mount 28, and the bottom end 47 of the locking rod 43 to be retracted through the lower opening 45 in the ridge 21a. End stops 50 are formed in the guide 44 against which corresponding end surfaces 52 formed on the locking rod 43 are locatable to limit the movement of the locking rod 43 in the guide 44.

The food processing tool unit 4 shown in FIGS. 1 and 2 is a slicing tool. It will be appreciated that a number of different food processing tool units may be used to achieve a different mechanical process for processing a food stuff. In the shown embodiment, the slicing tool comprises a cutting disc 53 and a drive shaft 54. The cutting disc 53 has a central aperture 55 through which the drive shaft 54 extends to engage the drive shaft 54 with the cutting disc 53. A radially extending blade 56 upstands from an upper surface 57 of the cutting disc 53, and a radially extending aperture 58 is formed through the cutting disc 53 so that a section of a food stuff that has been sliced by the blade 56 falls through the radially extending aperture 58 and into the lower part of the container.

A locating pin 60 is formed at a lower end of the drive shaft 54 and an upper end 62 of the drive shaft 54 extending through the cutting disc 53 engages with the tool unit engaging element to mechanically engage the food processing tool unit 4 with the gear mechanism in the lid housing.

The operation of the food processor will now be described with reference to the drawings. The food processing tool unit 4 is disposed in the container 2 and the locating pin 60 of the drive shaft 54 is received in the rod-receiving recess (not shown) formed in the centre of the container base 6. The lid 3 is then brought towards the container 2 so that the circumferentially extending collar 24 aligns with the inner surface 11 at the rim 9 of the container 2. The tabs 17, acting as attachment members, protruding from the inner surface 11 are aligned with the inlet section 37 of the slots 35 formed in the circumferentially extending peripheral surface 27 of the lid collar 24. Therefore, when the collar 24 is slid into the container 2, each tab 17 slides into the corresponding inlet section 37 in the lid collar 24.

When the lid collar 24 is received through the upper opening 8 of the container 2, the inner surface 11 of the container 2 lies parallel to, but spaced from, the circumferentially extending peripheral surface 27 of the lid collar 24. The locking rib 19 has a smaller protruding height from the inner surface 11 than the tabs 17 so that the locking rib 19 is able to slide over the circumferentially extending peripheral surface 27 of the lid collar 24 when the collar 24 is received through the upper opening 8 of the container 2 and the tabs 17 are received in the slots 35. As the collar 24 of the lid 3 is received through the rim 9 of the container 2 the upper end 62 of the drive shaft 54 extending through the cutting disc 53 engages with the tool unit engaging element to mechanically engage the tool unit 4 with the gear mechanism in the lid main body 23.

When the collar 24 is received through the upper opening 8 of the container 2 and the tabs 17 are received in the slots 35, the container rim 9 locates against the circumferentially extending ridge 21a.

The lid 3 is then rotated relative to the container 2 so that the collar 24 slides along the inner surface 11 of the container 2. The tabs 17 of the container 2 received in the slots 35 formed in the collar 24 slide in the slots along the attachment section 38 of the slots 35. Rotation of the lid 3 relative to the container 2 is limited by each tab 17 abutting the end wall forming an end stop 40 in each respective slot 35. The lid 3 and container 2 are then attached to each other, and removal of the lid 3 from the container 2 is prevented without rotating the lid 3 relative to the container 2 and drawing the two parts away from each other. When the lid 3 and container 2 are attached to each other, the locking rib 19 is disposed adjacent to the guide lower opening 45 in the ridge 21a.

It will be appreciated that the locking rod 43, which acts as a locking element, is initially in its disengaged position, with the helical spring 49 urging the top end 48 of the locking rod 43 to extend from upper opening 46 in the bottom of the drive unit mount 28, and the bottom end 47 of the locking rod 43 to be retracted in the guide 44 so that it does not extend through the guide lower opening 45 in the ridge 21a. Therefore, the locking rod 43 does not abut against any part of the container 2, and does not restrict movement of the container 3 relative to the lid 3.

To use the food processor 1, a user inserts the lower end 32 of the hand-held blender 5 into the drive unit mount 28 formed in the lid 3. When the hand-held blender 5 is inserted into the drive unit mount 28, the lower end 32 of the hand-held blender 5 abuts against the top end 48 of the locking rod 43 protruding into the drive unit mount 28 from the upper opening 46 of the guide 44 in the bottom of the drive unit mount 28. As the hand-held blender 5 is further slid into the drive unit mount, the lower end 32 of the blender 5 acts on the locking rod 43 and urges the locking rod 43 to slide in the guide 44, against the force of the helical spring. The locking rod 43 is therefore urged to slide from its disengaged position, wherein the bottom end 47 of the locking rod 43 is recessed in the guide 44, into its engaged position, in which the bottom end 47 of the locking rod 43 extends from the lower opening 45 in the ridge 21a and into the space between the inner surface 11 of the container 2 and the circumferentially extending peripheral surface 27 of the lid collar 24.

When the hand-held blender 5 is received in the drive unit mount 28, the locking rod 43 protrudes from the lid ridge 21a and lies adjacent to the side face 20 of the locking rib 19. Therefore, if a user attempts to rotate the lid 3 relative to the container 2, the locking rod 43 protruding from the lid 2 abuts against the locking rib 19 and prevents rotation of the lid 3 relative to the container 2. It will be appreciated that the lid 3 cannot be drawn away from the container 2 due to the tabs 17 of the container 2 being received in the attachment section 38 of the slots 35 formed in the collar 24.

The food processor is then operated by a user actuating the hand-held blender motor by pressing the operating button 36. The drive member engaging element (not shown) is engaged with the drive member 34 in the drive unit mount 28 and drives the food processing tool unit 4 by the tool unit engaging element of the gear mechanism acting on the drive shaft 54. A food stuff, such as a vegetable, is then inserted through the inlet aperture 25 and is sliced by the rotating blade 56 of the cutting disc 53. Once the food stuff has been processed, the user is able to stop the hand-held blender and withdraw it from the drive unit mount 28 in the lid. The locking rod 43 then slides from its engaged position, adjacent to the locking rib 19, to its disengaged position, due to the helical spring acting on the locking rod 43. The locking rod 43 is then retracted in the guide 44 and the locking rib 19 is not prevented from sliding about the lid collar 24. The lid 3 may then be rotated relative to the container 2 so that the tabs 17 of the container 2 slide in the attachment section 38 of the slots 35 and the container 2 can be detached from the lid 3. It will be appreciated that the lid 2 cannot be detached from the container whilst the hand-held blender 5, acting as a drive unit, is engaged with the food processing tool unit 4. An advantage of this arrangement is that a user cannot detach the lid from the container whilst the food processor is being operated.

Although in the above arrangement the food processing tool unit is separable from the lid and the container, it will be appreciated that in an alternative embodiment a food processing tool unit for mechanically processing a food stuff may be integrally formed with the lid, or the container. For example, the food processing tool unit may be integrally mounted to the lower end of the lid. One advantage of the food processing tool unit being separable from the lid and container is that it simplifies cleaning of the food processor.

Although in the above exemplary embodiment the locking rod abuts against a discrete locking rib to prevent the lid from rotating relative to the container, it will be appreciated that one of the tabs may form the locking rib.

Although in the above described embodiments, each attachment element is a slot formed in the collar and each attachment member is a tab formed on the container, it will be appreciated that the arrangement of the attachment means is not limited thereto. For example, in an alternative arrangement, each attachment element is a tab formed on the collar and each attachment member is a slot formed on the container.

Figure 5:
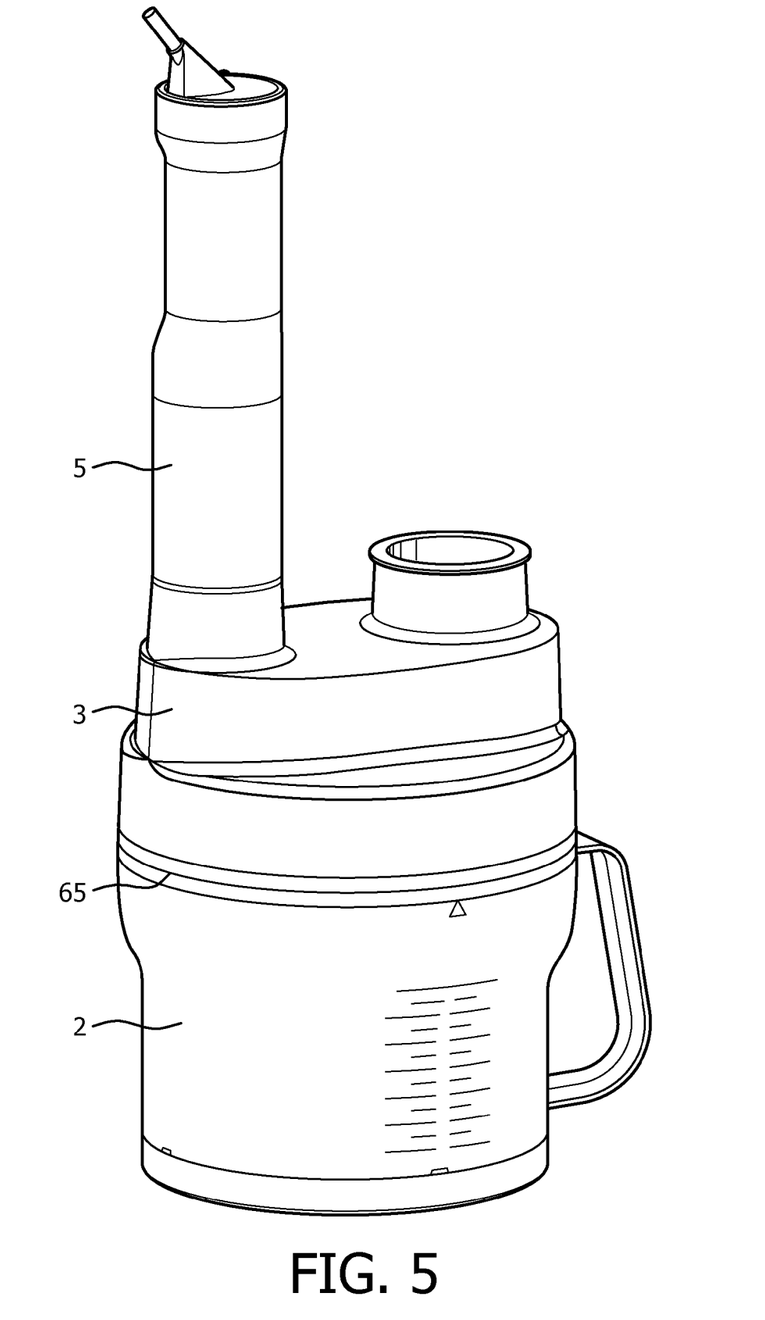
FIG. 5 shows a perspective view of a food processor for mechanically processing food configured with a cube cutting arrangement.
Figure 6:
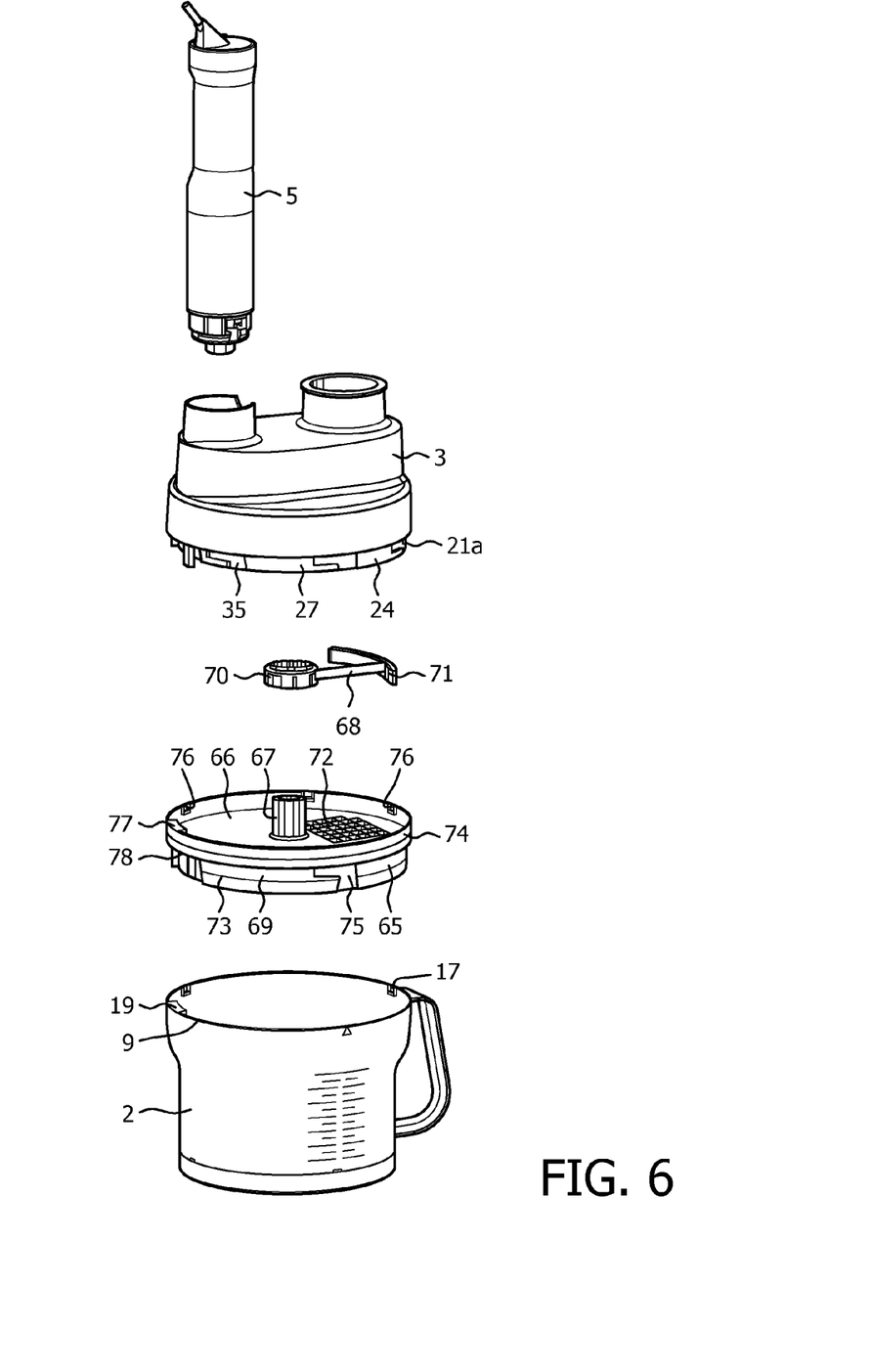
FIG. 6 shows an exploded perspective view of the food processor shown in FIG. 5.

Referring now to FIGS. 5 and 6, another arrangement of the food processor 1 is shown. In this arrangement, the same container 2, lid 3 and drive unit 5 are used, however an alternative food processing tool unit 65 is used. This food processing tool unit 65 is a dicing tool for mechanically processing a food stuff to cube the food stuff. The food processing tool unit 65 comprises base panel 66, a drive shaft 67, a rotating blade 68, and a cylindrical shoulder 69.

The drive shaft 67 is rotatably mounted to the centre of the base panel 66 and is rotatable about the base panel's central axis. The rotating blade 68 is fixedly engagable to the drive shaft 67 upstanding from the base panel 66 so that the rotating blade 68 rotates about the base panel's central axis when the drive shaft 67 is rotated. The blade 68 is spaced from the base panel 66 by guide members 70, 71. An array of vertically facing blades 72 are mounted in a section of the base panel 66 and are arranged in a grid to cube a food stuff when the food processor is operated, as will become apparent hereinafter.

The cylindrical shoulder 69 extends around and is integrally formed with the base panel 66 to form a circumferentially extending wall. A lower portion 73 of the cylindrical shoulder 69 has an outer face with a diameter corresponding to the diameter of the circumferentially extending peripheral surface 27 of the lid collar 24. Similarly, an upper portion 74 of the cylindrical shoulder 69 has an inner face with a diameter corresponding to the diameter of the inner surface 11 of the container 2. Therefore, the lower portion 73 of the cylindrical shoulder 69 is receivable through the upper opening 8 defined by the rim 9 of the container 2, and the lid collar 24 is receivable in the upper portion 74 of the cylindrical shoulder 69.

Tool unit slots 75, acting as attachment elements, are formed in the outer face of the cylindrical shoulder lower portion 73. The arrangement and position of the tool unit slots 75 correspond to the arrangement and position of the slots 35 formed in the circumferentially extending peripheral surface 27 of the lid collar 24. Similarly, tool unit tabs 76, acting as attachment members, protrude from the inner face of the cylindrical shoulder upper portion 74. The arrangement and position of the tool unit tabs 76 correspond to the arrangement and position of the tabs 17 extending from the inner surface 11 of the container 2. A tool unit locking rib 77, acting as a locking element, also protrudes from the inner face of the cylindrical shoulder upper portion 74, and the arrangement and position of the tool unit locking rib 77 correspond to the arrangement and position of the locking rib 19 extending from the inner surface 11 of the container 2.

It will therefore be appreciated that the lid and container may be attached to each other by the tabs 17 on the container locating in and engaging with the slots 35 in the lid collar 24. Alternatively, the lid and container may be attached to each other by the tabs 17 on the container 2 locating in and engaging with the tool unit slots 75 formed in the cylindrical shoulder lower portion 73 of the tool unit 65 and the tool unit tabs 76 on the cylindrical shoulder upper portion 74 of the tool unit 65 locating in and engaging with the slots 35 formed in the circumferentially extending peripheral surface 27 of the lid collar 24.

The food processing tool unit 65 further has a locking rod receiving hole 78 formed through the base panel 66 adjacent to the tool unit locking rib 77 through which the locking rod 43 is able to extend when the locking rod 43 is in its engaged position.

To use the food processor with the food processing tool unit 65 for dicing a food stuff, the lower portion 73 of the tool unit cylindrical shoulder 69 is received through the upper opening 8 defined by the rim 9 of the container 2 and the tabs 17 on the container are aligned with and located in the tool unit slots 75. The tool unit 65 is then rotated relative to the container 2 so that the tabs 17 on the container 2 connect with the tool unit slots 75 to mount the tool unit 65 to the container 2.

The lid collar 24 is then received in the upper portion 74 of the tool unit cylindrical shoulder 69, and the tool unit tabs 76 on the tool unit 65 are aligned with and located in the slots 35 formed in the circumferentially extending peripheral surface 27 of the lid collar 24. As the lid collar 24 is drawn towards the tool unit 65, the drive shaft 67 engages with the tool unit engaging element on the lid 2. The lid 3 is then rotated relative to the food processing tool unit 65 mounted to the container 2 so that the tool unit tabs 76 connect with the slots 35 on the lid collar 24 to mount the lid 3 to the food processing tool unit 65, and therefore attach the lid 3 to the container 2.

When the lid 2 is attached to the container 3 by the food processing tool unit 65 being mounted to the container 2, and the lid 3 being mounted to the food processing tool unit 65, the tool unit locking rib 77 lies above the locking rib 19 on the container 2, with the locking rod receiving hole 78 formed through the base panel 66 facing the guide lower opening 45 in the lid ridge 21a. Therefore, when the hand-held blender 5 is inserted into the drive unit mount 28 in the lid 3, the hand-held blender 5 acts on the locking rod 43 and urges the locking rod 43 to slide from the guide lower opening 45 in the ridge 21a of the lid 2. The bottom end 47 of the locking rod 43 slides from the guide 44 so that the locking rod 43 extends through the locking rod receiving hole 78 in the base panel 66 and lies adjacent to both the tool unit locking rib 77 and the container locking rib 19.

Although an outer band of the shoulder of the food processing tool unit 65 is exposed between the container and lid, it will be appreciated that the food processing tool unit is enclosed by the lid and container when the lid and container are attached to each other, whether directly or via the food processing tool unit because none of the operational parts of the food processing tool unit which mechanically process a food stuff are accessible to a user.

Therefore, the lid 2 is prevented from rotating relative to the food processing tool unit 65 by the tool unit locking rib 77 abutting the locking rod 43 extending from the lid 2, and so the tool unit tabs 76 cannot disconnect from the slots 35 on the lid collar 24. Furthermore, the food processing tool unit 65 is prevented from rotating relative to the container 3 by the container locking rib 19 abutting the locking rod 43 extending from the lid 2 and through the locking rod receiving hole 78 in the food processing tool unit 65, and so the tabs 17 on the container 2 cannot disconnect from the tool unit slots 75.

To detach the lid 3 from the container 2, the hand-held blender is removed from the drive unit mount 28, and the locking rod 43 retracts into the guide lower opening 45 in the ridge 21a of the lid 2 due to the helical spring acting on the locking rod 43. The lid is then free to rotate relative to the food processing tool unit 65, and the food processing tool unit is then free to rotate relative to the container 3.

However, it will be appreciated that the lid cannot be detached from the container during use of the food processor.

Although in the above exemplary embodiments a hand-held blender is used as the drive unit, it will be appreciated that an alternative drive unit may be used to drive the food processing tool unit of the food processor.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A food processor comprising:
    a container comprising:
        a locking rib, along a top edge within the container; and
    a lid releasably attachable to the container to enclose a food processing, the lid comprising:
        a drive unit mount configured to releasably mount a drive unit to the lid,
        an attachment element configured to releasably attach the lid to the container, and
    a locking mechanism comprising:
        a locking element,
        wherein the locking element is configured to be slidable from a disengaged position to an engaged position when the drive unit is mounted to the lid wherein in the engaged position the locking element engages the locking rib; and
    a food processing tool unit positioned between the container and the lid, the food processing tool unit comprising a hole though which the locking element passes to engage the locking rib.

2. The food processor according to claim 1, wherein the locking element is a rod.

3. The food processor according to claim 2, wherein one end of the rod extends into the drive unit mount when the rod is in its disengaged position wherein the drive unit, engaging the drive unit mount, abuts said one end urges the rod to slide from the disengaged position to the engaged position.

4. The food processor according to claim 3, further comprising:
    a resilient member configured to act on the locking element to bias the locking element towards the disengaged position.

5. The food processor according to claim 1, wherein the drive unit comprises:
    a hand-blender.

6. A food processor comprising:
a lid comprising:
  a drive unit mount configured to releasably mount a drive unit to the lid,
  a first attachment element configured to releasably attach the lid to a container,
a food processing tool unit connectable to the lid; and
a container releasably attachable to the lid, wherein a locking element, in the lid, is configured to:
  engage the container through the food processing tool unit to lock the lid to the container.

7. The food processor according to claim 6, wherein the container comprises:
  a first attachment member to engage the first attachment element of the lid.

8. The food processor according to claim 7, wherein one of the first attachment element and the first attachment member is a tab and the corresponding first attachment element and the first attachment member is a slot configured to receive the tab, wherein the lid and container are slidable relative to each other.

9. The food processor according to claim 7, wherein the lid further comprises:
  a cylindrical collar configured to overlap a circumferentially extending wall of the container when the lid and container are brought together, the attachment element being formed on the collar and the attachment member being formed on the wall of the container; and
  a collar rotatable relative to the wall to connect the attachment element with the attachment member.

10. The food processor according to claim 9, wherein the locking element is configured to engage the circumferentially extending wall of the container.

11. The food processor according to claim 10, wherein the wall further comprises:
  a locking rib protruding therefrom, and
  the locking element is configured to lie in the path of the locking rib, wherein the locking element abuts the locking rib.

12. The food processor according to claim 7, wherein the food processing tool unit is releasably connectable to the container.

13. The food processor according to claim 12, wherein the food processing tool unit comprising:
  a second attachment member connectable to the first attachment element on the lid; and
  a second attachment element connectable to the first attachment member on the container.

14. The food processor according to claim 12, wherein the locking element is configured to:
  engage the food processing tool unit and the container t when the locking element is in the engaged position.

15. The food processor according to claim 14, wherein the locking element is configured to:
  extend through the food processing tool unit to engage the container.

16. A food processor comprising:
a container comprising:
  a drive shaft extending from a central location of a bottom of the container;
  a side wall extending vertically from edge locations of the bottom of the container; and
  a rib formed at an upper location of a side wall, and
a lid comprising:
  an inlet aperture;
  a drive unit mounting element, and
  a locking element slidable within the drive mounting element, said locking element abutting the rib when a drive unit is positioned within the drive mounting element; and
  a food processing tool unit attached to the lid engaging the drive shaft when the lid is positioned on the container.

17. The food processor of claim 16 wherein the food processing tool unit is one of: fixedly attached to the lid and removably attached to the lid.

18. The food processor of claim 16, wherein the locking element slides through the food processing tool unit.

19. The food processor of claim 16, wherein the lid includes a plurality of first attachment elements circumferentially positioned around the lid and the container includes a plurality of first attachment mechanisms circumferentially positioned around the container, said first plurality of attachment elements engaging corresponding ones of the first plurality of attachment means.

20. The food processor of claim 16, wherein
the lid comprises a plurality of first attachment elements circumferentially positioned around the lid;
the food processing tool unit comprises a plurality of second attachment mechanisms and a plurality of second attachment elements circumferentially positioned around the food processing tool unit; and
the container comprises a plurality of first attachment mechanisms circumferentially positioned around the container, said plurality of first attachment elements engaging corresponding ones of the plurality of second attachment means and said plurality of second attachment elements engaging corresponding ones of the plurality of first attachment mechanisms.

* * * * *